(12) United States Patent
Lin

(10) Patent No.: US 7,310,773 B2
(45) Date of Patent: Dec. 18, 2007

(54) REMOVAL OF EXTRANEOUS TEXT FROM ELECTRONIC DOCUMENTS

(75) Inventor: Xiaofan Lin, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 354 days.

(21) Appl. No.: 10/346,795

(22) Filed: Jan. 13, 2003

(65) Prior Publication Data

US 2004/0139384 A1     Jul. 15, 2004

(51) Int. Cl.
    G06F 17/00     (2006.01)
(52) U.S. Cl. .................................................. 715/531
(58) Field of Classification Search ............... 715/530, 715/531, 529, 522
    See application file for complete search history.

(56) References Cited

U.S. PATENT DOCUMENTS

| | | | | |
|---|---|---|---|---|
| 5,937,422 A * | 8/1999 | Nelson et al. | ............ | 715/531 |
| 5,971,589 A * | 10/1999 | Hazama et al. | ............ | 700/145 |
| 6,006,240 A * | 12/1999 | Handley | ............ | 715/510 |
| 6,256,610 B1 | 7/2001 | Baum | | |
| 6,304,870 B1 * | 10/2001 | Kushmerick et al. | ............ | 707/4 |
| 6,336,094 B1 | 1/2002 | Ferguson et al. | | |
| 6,353,840 B2 | 3/2002 | Saito et al. | | |
| 6,470,306 B1 | 10/2002 | Pringle et al. | | |
| 2001/0043741 A1 * | 11/2001 | Mahoney et al. | ............ | 382/199 |
| 2002/0049787 A1 * | 4/2002 | Keely et al. | ............ | 707/512 |
| 2003/0046263 A1 * | 3/2003 | Castellanos et al. | ............ | 707/1 |
| 2003/0046280 A1 * | 3/2003 | Rotter et al. | ............ | 707/6 |
| 2003/0152293 A1 * | 8/2003 | Bresler et al. | ............ | 382/305 |
| 2003/0184804 A1 * | 10/2003 | Mastie et al. | ............ | 358/1.16 |
| 2003/0225853 A1 * | 12/2003 | Wang et al. | ............ | 709/217 |
| 2004/0205568 A1 * | 10/2004 | Breuel et al. | ............ | 715/513 |

* cited by examiner

*Primary Examiner*—Stephen Hong
*Assistant Examiner*—Adam M. Queler (57) ABSTRACT

Method and apparatus for removing lines of extraneous text from a document. Similarities are identified between lines of text on each page and corresponding lines on a selected subset of pages. Different weight values are associated with different line numbers of text on a page, each weight value indicating a degree of likelihood that a line of text contains extraneous text. One or more lines of text are selectively removed from a page as a function of the similarities and associated weight values of line numbers of the lines of text.

22 Claims, 5 Drawing Sheets

106

HPL-2002-150                               *Introduction*

Originated from the social science (Grofman et al., 1983), voting has become a popular system combination technique in various engineering disciplines, especially in pattern recognition (Xu et al., 1992; Ho et al., 1994; Lam and Suen, 1997). The appeal of voting arises from its generality, simplicity, and effectiveness. For most problems with several solutions, voting can be used to improve the system's reliability or accuracy. In the most naive form, voting treats individual systems as black boxes and needs no additional internal information for the implementation. More importantly, in many realworld applications, there is only marginal, if any at all, performance difference between voting and more advanced combination schemes, which usually require more detailed information from individual systems, greater development efforts, and customization to a specific domain (Lee et al., 1993). Voting is especially advantageous for the combination of some commercial-of-the-shelf (COTS) classifiers, from which we cannot get information beyond the top candidates. On the other hand, most work is experimental in nature and does not answer why voting is effective and what is the theoretical limit of a voting system. In this respect, Lam and Suen (1997) conducted an in-depth research on the

HPL-2002-150                               *Introduction* behavior of majority voting, which requires the agreement of more than *half* of the participants to reach a decision. In reality, another common variant of voting is plurality voting, which selects the candidate with the *most* votes. Many people do not distinguish between plurality voting and majority voting, and are more accustomed to the term of "majority voting" even if the underlining criterion is plurality voting. This paper analyzes the performance of classifier combination by plurality voting in terms of recognition/error/rejection rates, and emphasizes the relationship as well as the difference between majority voting and plurality voting.

This paper is organized as follows. In Section 2, the rationale of plurality voting is investigated theoretically. Section 3 employs the Monte Carlo method to analyze how the combination system's recognition rate is affected by various parameters such as the number of classifiers, the number of classes, and the recognition rates of individual classifiers. Section 4 discusses how to control the reliability in plurality voting and shows the advantage of plurality voting over majority voting. In Section 5, some practical considerations are addressed to fill the gap between theory and reality. Section 6 gives a summary and suggests future

REMOVAL OF EXTRANEOUS TEXT FROM ELECTRONIC DOCUMENTS

FIELD OF THE INVENTION

The present disclosure generally relates to removing extraneous text from electronic documents.

BACKGROUND

Computer-based processing of text documents is performed for a variety of purposes. Two example categories of document processing applications are natural language processing applications and document repurposing. Natural language processing generally involves providing accessibility to the information contained in a text document, for example, by way of indexing information, generating speech from the text, or translating text from one language to another. Specific tasks associated with natural language processing applications include part-of-speech tagging, grammatical parsing, keyword extraction and information retrieval, and text summarization.

Document repurposing involves reusing the information of a document in a different context. For example, in one form of document repurposing a document is converted from one format, such as a word processor based format, to another format, such as HTML. Another example of document repurposing involves converting a paper-based document to a text-based electronic form using a scanner and OCR technology.

The presence of extraneous text, for example, headers and footers, in documents may cause problems in natural language processing and document repurposing applications. Headers and footers found on pages of a document often include information such as page numbers, dates, revision numbers, chapter headings, as well as decorative information. In some document text formats, the text of the headers and footers is embedded in the text of the body of the document and has no associated identification tags. In natural language processing applications, this information will change the context of neighboring words in part-of-speech tagging, introduce grammar errors, and distort statistics accumulated in keyword extraction and information retrieval. In document repurposing applications, headers and footers will interrupt the flow of the text of the body of the document.

A system and a method that address the aforementioned problems, as well as other related problems, are therefore desirable.

SUMMARY OF THE INVENTION

The present invention may aid in removing lines of extraneous text from a document. Similarities may be identified between lines of text on each page and corresponding lines on a selected subset of pages. Different weight values may be associated with different line numbers of text on a page, each weight value may indicate a degree of likelihood that a line of text contains extraneous text. One or more lines of text may be selectively removed from a page as a function of the similarities and associated weight values of line numbers of the lines of text.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which:

FIGS. 1A and 1B illustrate successive pages of a document;

DETAILED DESCRIPTION

A document generally includes text that conveys the actual information of the document ("body text") along with extraneous text. Examples of extraneous text include headers, footers, or other extraneous lines that happen to fall within the body text. The extraneous text may be found in various sections of the document such as a title page, a table of contents, pages of the body, an index, a glossary, and appendices.

FIGS. 1A and 1B illustrate successive pages of a document. The pages primarily contain body text along with footers 102 and 104 and headers 106 and 108. The footers 102 and 104 contain information that identifies the pages as pages 10 and 11, respectively. The date, "May 21, 2002," is also included in the footers. The headers 106 and 108 include the identifier, "HPL-2002-150," and the section heading, "Introduction." It will be appreciated that headers and footers may contain more than one line of text, depending on the document.

The presence of extraneous text in a document may create problems for natural language processing applications and for document repurposing applications. The extraneous text is likely to create errors in the grammar of the body text. For example, footer 102 and header 108 by their page-relative positions fall in the middle of the last sentence that begins on page 10 and continues on page 11. The footer and header cause the sentence to read, "In this respect, Lam and Suen (1997) conducted an in-depth research on the May 21, 2002 10 HPL-2002-150 Introduction behavior of majority voting, which requires the agreement of more than half of the participants to reach a decision." Where a document text contains no tags that identify the headers and footers, machine identification of the extraneous text is difficult.

Figure 2:
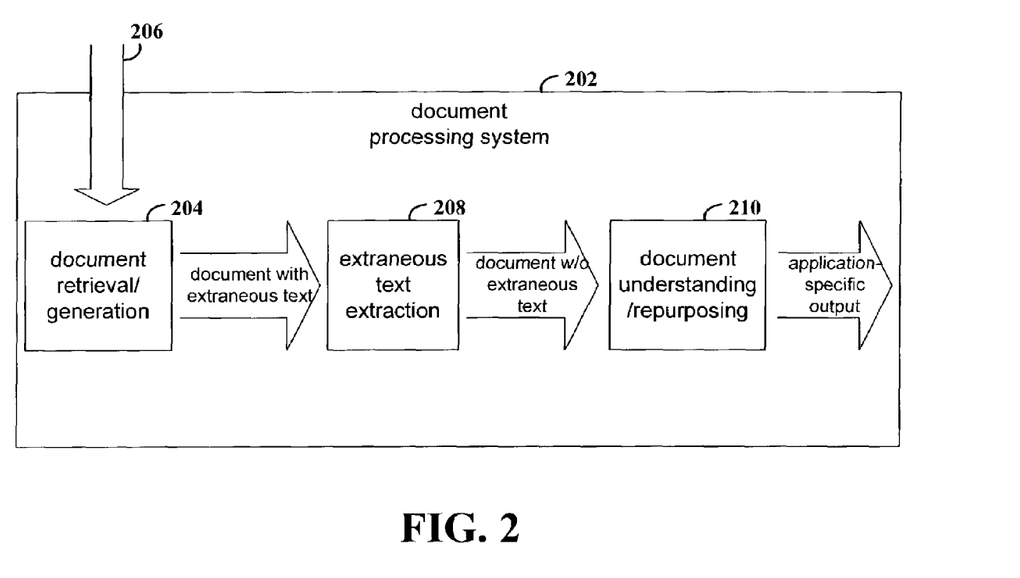
FIG. 2 is a block diagram of a document processing system in accordance with various embodiments of the invention.

FIG. 2 is a block diagram of a document processing system in accordance with various embodiments of the invention. Document processing system 202 may host one or more applications for analyzing and obtaining information ("document understanding") or reformatting a document for a new purpose ("repurposing"). The system may be a stand-alone data processing system or an arrangement of networked data processing systems, depending on implementation requirements. The various systems components may be embodied in or readable from computer-readable media. For example, the data and/or instructions may be embodied in or readable from a memory, data storage device, ASIC, remove storage or computing devices coupled to the system via a network.

Document understanding applications include, for example, those related to natural language processing. Specific examples include translating from one language to another, summarizing the content of a document, and indexing and retrieving information from a document. Repurposing applications include, for example, those related to reformatting the text from one format, such as PDF, to a different format, such as HTML.

Document retrieval/generation block 204 obtains the input text document 206. The specific hardware and software involved in retrieving a document depend on the source from which the document is obtained. For example, if the source is a paper document the retrieval/generation block 204 may include a scanner and OCR software. If the source is a PDF file, the retrieval/generation block 204 may access a file that is either stored locally or stored at another node on a network. The text document provided by the retrieval/generation block 204 to the extraneous text extraction block 208 is page-based, with each word having associated page-relative coordinate information. For example, each word has an associated bounding box that is defined with 4 values, x1, y1, x2, and y2 (the corners of the box being defined by coordinate pairs (x1, y1), (x1, y2), (x2, y1), and (x2, y2)).

The extraneous text extraction block 208 identifies the extraneous text and in one embodiment removes the extraneous text before providing the document to the document understanding/repurposing block 210. In an alternative embodiment, the extraneous text is tagged so that the document understanding/repurposing block 210 may ignore it in the analysis or reformatting.

Figure 3:
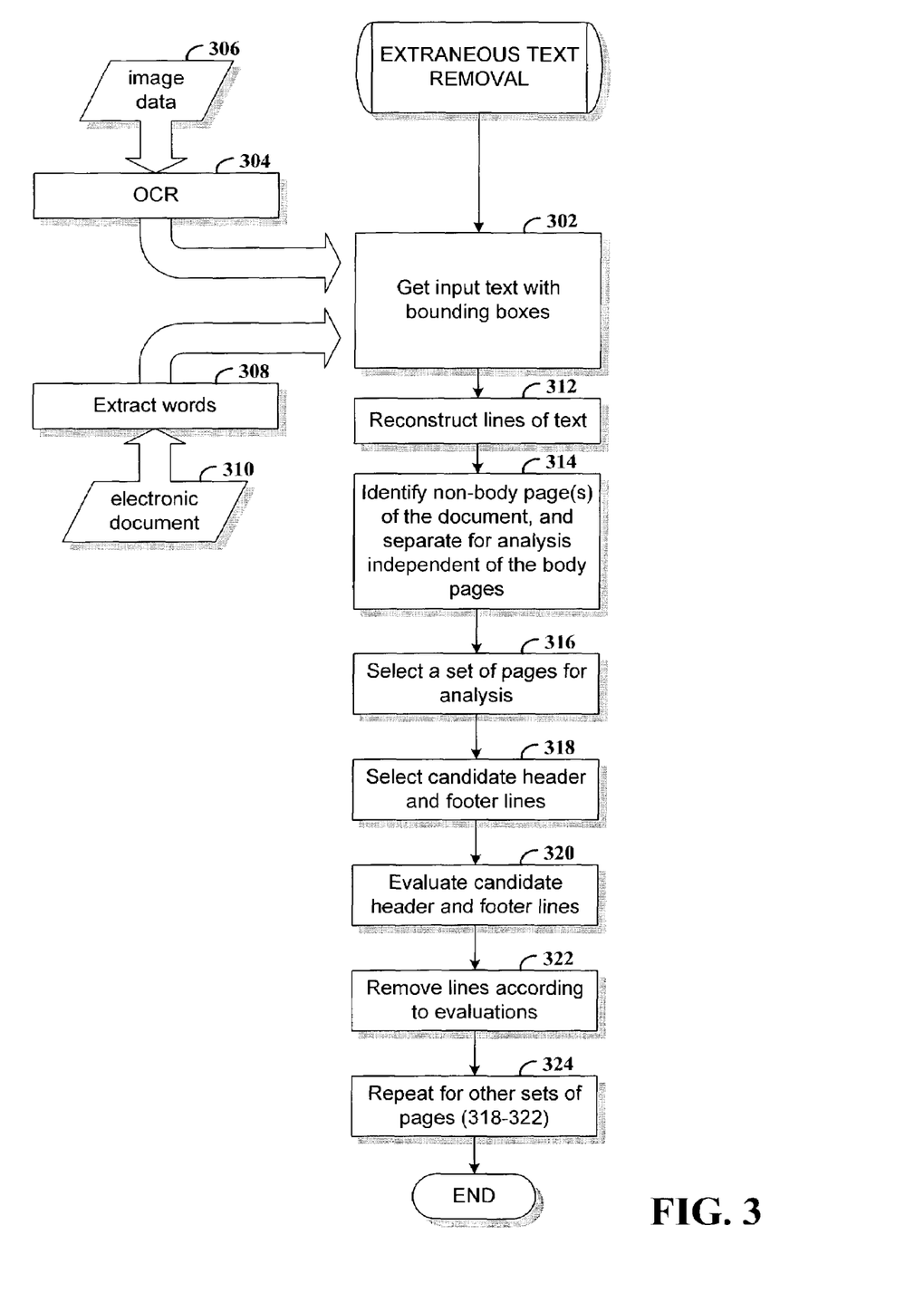
FIG. 3 is a flowchart of a process for removing extraneous text from a document in accordance with various embodiments of the invention.

FIG. 3 is a flowchart of a process for removing extraneous text from a document in accordance with various embodiments of the invention. The process begins by obtaining the input text document (step 302), either from image data 304 or from an existing electronic document 306. For image data, OCR block 308 reads the image data and generates a text document for input to the process. For an electronic document, the words are extracted (block 310) and input to the process. For both sources of an input text document, page information and page-relative coordinates that are associated with the words are input to the process.

The process continues with reconstructing the lines of text (step 312). The lines of text are reconstructed because in some cases OCR software may identify a single header or footer line as two separate lines if there is a large space between the text along with some misalignment of the separated text. The line reconstruction process is described further in FIG. 4.

Once the lines of text have been reconstructed, the pages of the document that might contain header and footer information that is different from header and footer information on other pages of the document are identified (step 314). For example, the title page, table of contents, index, glossary, appendix, or other supplementary pages might have header and footer information that is different from pages in the body of the document. In one embodiment, these special pages may be identified in accordance with the teachings of patent/application 10/139,041, filed May 3, 2002, by Xiaofan Lin, and entitled, "A Method for Determining a Logical Structure of a Document." Each set of these non-body pages may be first analyzed together with the body of the document and then separated, either logically or physically, for analysis separate from the body pages of text. For example, if the whole document has 100 pages, including 10 chapters, the first page of each of the 10 chapters are identified (e.g., pages 12, 25, 34, 56, 70, 76, 84, 90, 95, and 98). One set of pages includes all 100 pages, and another set of pages includes only pp. 12, 25, 34, 56, 70, 76, 84, 90, 95, and 98. In the second set, pages 12, 25, 34, 56, 70, 76, 84, 90, 95, and 98 are treated as ten successive pages. The first pages of each chapter are analyzed as a set because these pages may have similar extraneous text that is absent from the other 90 pages. For example, the pages might contain the title of the document as the header.

One of the sets of pages is then selected for analysis, for example, the body pages (step 316). Candidate lines are then selected for purposes of evaluation (step 318). For example, for headers and footers, lines at the top and bottom of a page are more likely than other lines to contain extraneous text. In one embodiment, the first three lines of a pages are selected as candidate header lines and the last three lines as candidate footer lines. It will be appreciated that if a particular document format is known to contain extraneous text on one or more lines other than header and footer lines, then those lines may also be selected for analysis. Selecting only a few of the lines for analysis reduces processing time. The selection of lines may be accomplished via user-input parameters or pre-programmed.

On each page of the selected set of pages, the candidate lines of text are evaluated (step 320). Further explanation of an example evaluation process is provided in the description of FIG. 5. The lines identified as containing extraneous text are then removed (step 322). In one embodiment, the lines may be physically removed from the data set, and in another embodiment, the lines may be removed by designating them as extraneous text. For the other sets of pages, for example table of contents and index, the process steps of 316-322 may be repeated as desired.

Figure 4:
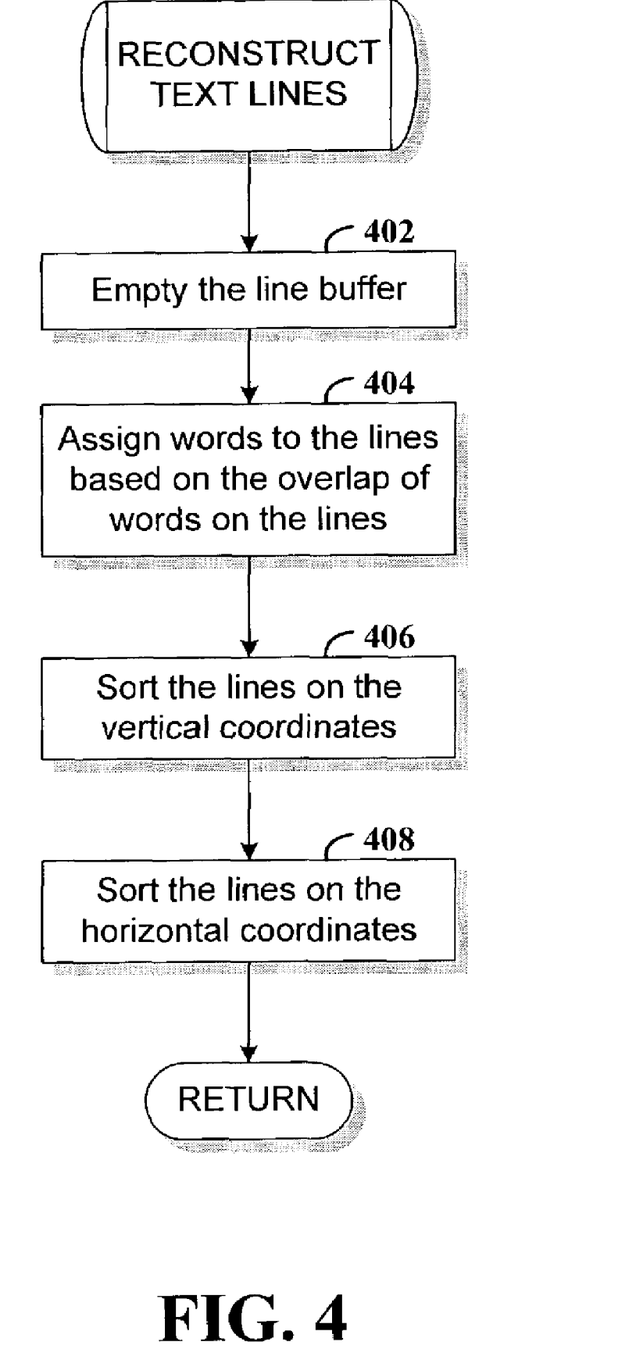
FIG. 4 is a flowchart of a process for reconstructing lines of text in a document in accordance with various embodiments of the invention.

FIG. 4 is a flowchart of a process for reconstructing lines of text in a document in accordance with various embodiments of the invention. The buffer containing the lines of text is first emptied (step 402). The words are then assigned to lines of the line buffer based on the overlap of the words with lines (step 404). For example, each word is examined. If the height of the word overlaps any existing line by more than ½ the height of the word, then the word is added to that line. If no line exists for which the overlap is satisfied, a new line is created in the line buffer, and the word is added to the new line. The bounding box of the reconstructed line is the minimum rectangle that can cover all the characters in the line. The bounding box of the reconstructed line is defined by the smallest values of the x1 and y1 values of individual characters in the line and the largest of the x2 and y2 values of individual characters in the line.

The lines are then sorted top to bottom by page and using relative vertical positions of the lines on the page (step 406). Within each line, the words are sorted left to right using the relative horizontal positions of the words (step 408).

Figure 5:
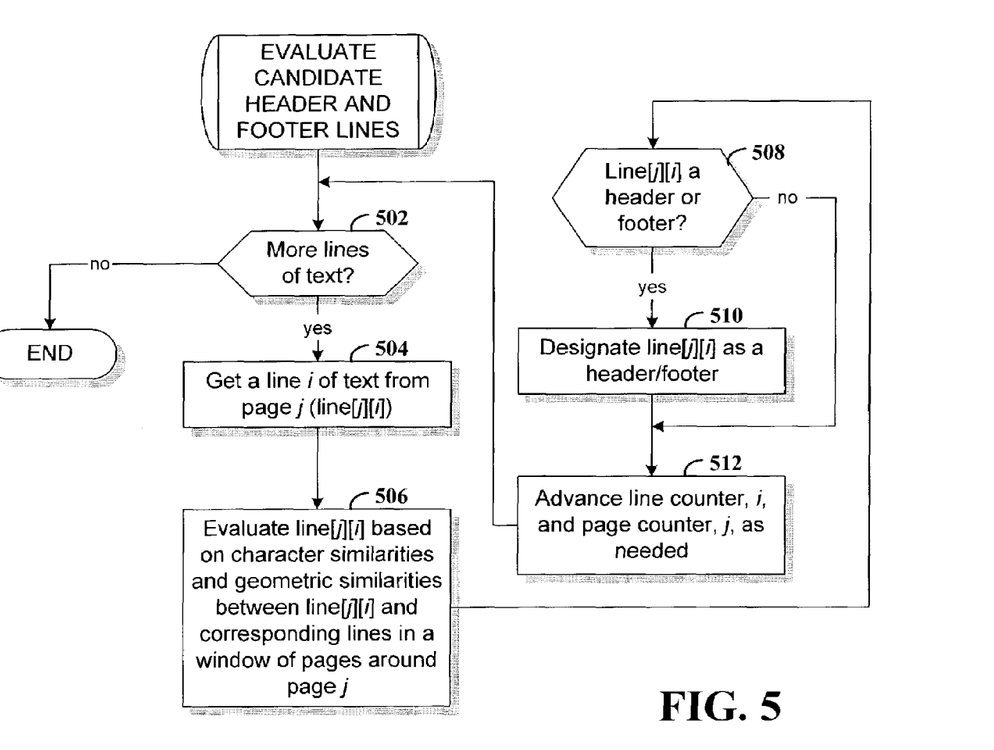
FIG. 5 is a flowchart of a process for identifying extraneous text in a document in accordance with various embodiments of the invention.

FIG. 5 is a flowchart of a process for identifying extraneous text in a document in accordance with various embodiments of the invention. As long as there remains at least one line of text to process (decision step 502), the process selects an unprocessed line i from page j of the text (step 504). This description assumes that the lines are processed in order on each page before advancing to process lines on the next page. However, it will be appreciated that any other order may be used if suitable for certain implementation objectives.

Figure 6:
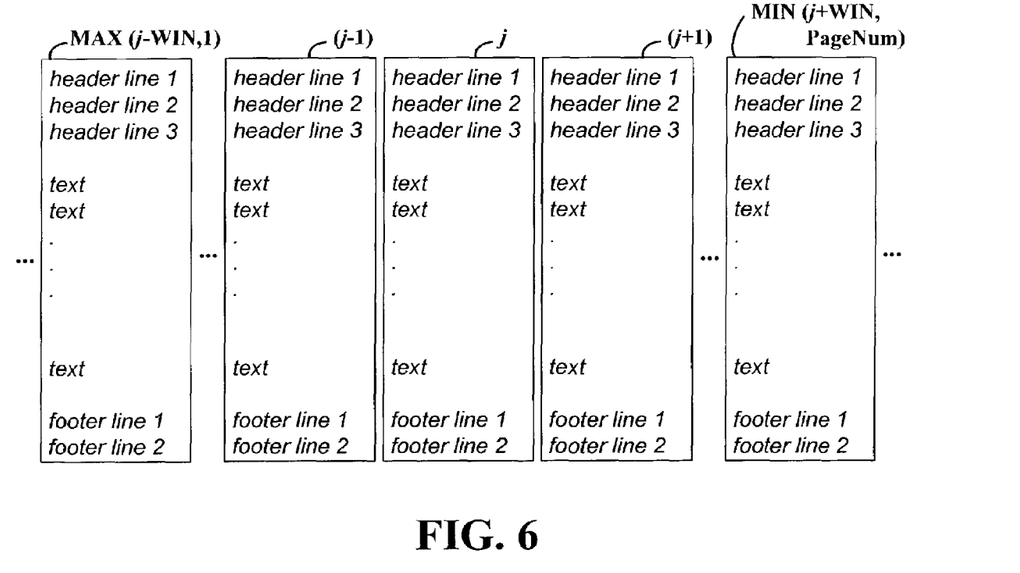
FIG. 6 illustrates a set of pages that may be used in identifying the extraneous text of page j.

Each line is judged based on character similarities and geometric similarities with corresponding lines on other pages of text. In one embodiment, the pages used for comparison are a set of pages immediately preceding and succeeding the page of the line currently being judged. FIG. 6 illustrates a set of pages used in identifying the extraneous text of page j. The set of pages ranges from page MAX(j−WIN,1) to page MIN(j+WIN,PageNum), where:

MAX(m,n) refers to the maximum of m and n;
MIN(m,n) refers to the minimum of m and n;
WIN is a selected constant used to define the "window" size of the set of pages; and
PageNum is the number of pages in the set of pages from which the extraneous text is being removed.

By considering the neighboring pages within a window, various types of header/footer patterns are considered, with the effect being that a line's score is high only if there are similar lines within the window.

A score is accumulated for each line to determine the likelihood that the line contains extraneous text. The Score (Line[j][i])=

$$\sum_{k=\max(j-WIN,1)}^{k\leq\min(j+WIN,PageNum)} weights[i] * Similarity(Line[j][i], Line[k][i])$$

Lines with sufficient scores are judged to be extraneous text.

The weights[i] term accounts for the fact that different lines have different probabilities of being extraneous text. For example, the first line is more likely to be a header line than is the second line, and the second line is more likely to be a header line than the third line. In an example embodiment, the respective weights of the candidate header lines 1, 2, and 3 are 1.0, 0.75, and 0.5, and the respective weights of the candidate footer lines n−2, n−1, and n (n is the number of lines on a page) are 0.5, 0.75, and 1.0.

The Similarity(Line[*j*][*i*],Line[*k*][*j*])=

BaseSimilarity(Line[*j*][*i*],Line[*k*][*i*]) * GeometrySimilarity(Line[*j*][*i*],Line[*K*][*i*])

The BaseSimilarity accounts for text similarities between the two lines. The text strings contained in the two lines are matched using dynamic programming to minimize the total substitution/insertion/deletion cost. From this matching, the BaseSimilarity(Line[j][i],Line[k][i]) is computed as:

number of matched characters/greatest number of characters in the two lines.

An example dynamic programming technique for finding the optimal match between two strings is described in *Pattern Recognition* by Sergios Theodoridis and Konstantinos Koutroumbas, p. 283-291, Elsevier Science (USA). In the example embodiment, all digits in the two lines are treated as the same character. This addresses documents having chapter numbers and page numbers in the headers and footers. Thus, "Chapter 2" in one line will match Chapter 5" in another line because the strings are compared as "Chapter #" and "Chapter #".

The GeometrySimilarity accounts for similarities in sizes of the two lines. For example, if line 1 has a width w1 and a height h1, and line 2 has a width w2 and a height h2, the GeometrySimilarity is computed as:

(MIN(w1,w2)/MAX(w1,w2)) * (MIN(h1,h2)/MAX(h1,h2))

The GeometrySimilarity helps to avoid mismatches between header/footer lines and lines of body text because the body text and headers/footers are often in different font sizes.

The accumulated score of a line is used to determine whether a line is extraneous text (decision step 508). In one embodiment, if the line's score exceeds a selected threshold, for example, 1.8, the line is judged to have extraneous text, and the line is designated as such (step 510). Depending on the implementation, the line may be physically removed from the set of lines under consideration. The line counter i and page counter j are advanced as needed to process further lines of text in the document (step 512).

The present invention is believed to be applicable to a variety of applications which would benefit from removal of extraneous text from electronic documents and has been found to be particularly applicable and beneficial in identifying headers and footers in electronic documents. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for removing lines of extraneous text from a plurality of pages of text, comprising:
   identifying similarities between lines of text on each page and corresponding lines on a selected subset of pages;
   associating different weight values with different line numbers of a page, each weight value indicating a degree of likelihood that a line of text at the line number contains extraneous text;
   selectively removing one or more lines of text at corresponding line numbers from each of the plurality of the pages as a function of the similarities and associated weight values of line numbers of the lines of text;
   identifying non-body pages of text;
   logically grouping body pages of text in a first set of pages and non-body pages in a second set of pages;
   wherein the selected subset of pages used in identifying similarities between corresponding lines of text includes pages of the first set and the second set; and
   identifying similarities between lines of text of each page in the second set and corresponding lines on a selected subset of the second set of pages.

2. The method of claim 1, further comprising:
   receiving input data in which each word has associated attributes that indicate a page-relative bounding box; and
   for each word for which a selected portion of a height of the page-relative bounding box overlaps a line, assigning the word to the line on a page.

3. The method of claim 1, wherein identifying similarities comprises comparing for equality of characters at corresponding positions of corresponding lines of text.

4. The method of claim 3, wherein identifying similarities comprises quantifying similarities as a function of a number of equal characters.

5. The method of claim 4, wherein identifying similarities comprises quantifying similarities as a function of bounding boxes of the corresponding lines.

6. The method of claim 3, wherein identifying similarities comprises processing all digit characters as being equal to a selected character.

7. The method of claim 1, wherein each page has a top and a bottom, the method further comprising selecting a number of lines of text at the top and bottom of each page for identifying similarities.

8. An apparatus for removing lines of extraneous text from a plurality of pages of text, comprising:
   means for identifying similarities between lines of text on each page and corresponding lines on a selected subset of pages;

means for associating different weight values with different line numbers of a page, each weight value indicating a degree of likelihood that a line of text at the line number contains extraneous text;

means for selectively removing one or more lines of text at corresponding line numbers from each of the plurality of the pages as a function of the similarities and associated weight values of line numbers of the lines of text; means for identifying non-body pages of text;

means for logically grouping body pages of text in a first set of pages and non-body pages in a second set of pages;

wherein the selected subset of pages used in identifying similarities between corresponding lines of text includes pages of the first set and the second set; and means for identifying similarities between lines of text of each page in the second set and corresponding lines on a selected subset of the second set of pages.

9. A document processing system, comprising:

at least one data processing system, wherein the at least one data processing system is configured with: a memory;

a document retrieval component arranged to obtain an electronic document including a plurality of pages of text;

a text extraction component coupled to the document retrieval component, the text extraction component configured to identify similarities between lines of text on each page and corresponding lines on a selected subset of pages, associate different weight values with different line numbers of text on a page, each weight value indicating a degree of likelihood that a line of text at the line number contains extraneous text, and selectively remove one or more lines of text at corresponding line numbers from each of the plurality of the pages as a function of the similarities and associated weight values of line numbers of the lines of text; and an application coupled to the text extraction component, the application configured to process the document without the extraneous text; wherein the text extraction component is configured to identify non-body pages of text, logically group body pages of text in a first set of pages and non-body pages in a second set of pages, wherein the selected subset of pages used in identifying similarities between corresponding lines of text includes pages of the first set and the second set, and identify similarities between lines of text of each page in the second set and corresponding lines on a selected subset of the second set of pages.

10. The system of claim 9, wherein:

the document retrieval component is configured to generate words of text, each word having an associated page-relative bounding box; and the text extraction is configured to, for each word for which a selected portion of a height of the page-relative bounding box overlaps a line, assign the word to the line on a page.

11. The system of claim 9, wherein the text extraction component is configured to compare for equality of characters at corresponding positions of corresponding lines of text.

12. The system of claim 11, wherein the text extraction component is configured to quantify similarities as a function of a number of equal characters.

13. The system of claim 12, wherein the text extraction component is configured to quantify similarities as a function of bounding boxes of the corresponding lines.

14. The system of claim 11, wherein the text extraction component is configured to process all digit characters as being equal to a selected character.

15. The system of claim 9, wherein each page has a top and a bottom, the system further comprising selecting a number of lines of text at the top and bottom of each page for identifying similarities.

16. An article of manufacture, comprising:

a computer-readable medium configured with instructions for causing a computer to remove lines of extraneous text from a plurality of pages of text by performing the steps of, identifying similarities between lines of text on each page and corresponding lines on a selected subset of pages;

associating different weight values with different line numbers of text on a page, each weight value indicating a degree of likelihood that a line of text at the line number contains extraneous text;

selectively removing one or more lines of text at corresponding line numbers from each of the plurality of the pages as a function of the similarities and associated weight values of line numbers of the lines of text; identifying non-body pages of text;

logically grouping body pages of text in a first set of pages and non-body pages in a second set of pages;

wherein the selected subset of pages used in identifying similarities between corresponding lines of text includes pages of the first set and the second set; and identifying similarities between lines of text of each page in the second set and corresponding lines on a selected subset of the second set of pages.

17. The article of manufacture of claim 16, wherein the computer-readable medium is further configured to cause a computer to perform the steps, further comprising:

receiving input data in which each word has associated attributes that indicate a page-relative bounding box; and for each word for which a selected portion of a height of the page-relative bounding box overlaps a line, assigning the word to the line on a page.

18. The article of manufacture of claim 16, wherein identifying similarities comprises comparing for equality of characters at corresponding positions of corresponding lines of text.

19. The article of manufacture of claim 18, wherein identifying similarities comprises quantifying similarities as a function of a number of equal characters.

20. The article of manufacture of claim 19, wherein identifying similarities comprises quantifying similarities as a function of bounding boxes of the corresponding lines.

21. The article of manufacture of claim 18, wherein identifying similarities comprises processing all digit characters as being equal to a selected character.

22. The article of manufacture of claim 16, wherein each page has a top and a bottom, and the steps further comprise selecting a number of lines of text at the top and bottom of each page for identifying similarities.

* * * * *

UNITED STATES PATENT AND TRADEMARK OFFICE
CERTIFICATE OF CORRECTION

| | |
|---|---|
| PATENT NO. | : 7,310,773 B2 |
| APPLICATION NO. | : 10/346795 |
| DATED | : December 18, 2007 |
| INVENTOR(S) | : Xiaofan Lin |

It is certified that error appears in the above-identified patent and that said Letters Patent is hereby corrected as shown below:

In column 7, line 31, in Claim 9, after "numbers of" delete "text on".

In column 8, line 20, in Claim 16, after "numbers of" delete "text on".

Signed and Sealed this

Twenty-seventh Day of May, 2008

JON W. DUDAS
*Director of the United States Patent and Trademark Office*